United States Patent
Fuscoe et al.

(10) Patent No.: US 10,297,074 B2
(45) Date of Patent: May 21, 2019

(54) THREE-DIMENSIONAL MODELING FROM OPTICAL CAPTURE

(71) Applicant: Fuscoe Engineering, Inc., Irvine, CA (US)

(72) Inventors: Patrick R. Fuscoe, Irvine, CA (US);
Michael A. Ijams, Irvine, CA (US);
Matthew H. Vega, Tustin, CA (US)

(73) Assignee: Fuscoe Engineering, Inc., Irvine, CA (US)

(*) Notice: Subject to any disclaimer, the term of this patent is extended or adjusted under 35 U.S.C. 154(b) by 0 days.

(21) Appl. No.: 15/653,442

(22) Filed: Jul. 18, 2017

(65) Prior Publication Data

US 2019/0026938 A1    Jan. 24, 2019

(51) Int. Cl.
*G06T 17/05* (2011.01)
*G06T 7/564* (2017.01)
*G06T 15/04* (2011.01)
*G01C 11/02* (2006.01)

(52) U.S. Cl.
CPC .............. *G06T 17/05* (2013.01); *G01C 11/02* (2013.01); *G06T 7/564* (2017.01); *G06T 15/04* (2013.01); *G06T 2200/04* (2013.01); *G06T 2210/56* (2013.01)

(58) Field of Classification Search
CPC ......... G06T 17/05; G06T 7/564; G06T 15/04; G06T 2200/04
See application file for complete search history.

(56) References Cited

U.S. PATENT DOCUMENTS

| | | | |
|---|---|---|---|
| 4,970,666 A | 11/1990 | Welsh et al. | |
| 5,166,878 A | 11/1992 | Poelstra | |
| 6,004,314 A * | 12/1999 | Wei | A61B 3/102 606/12 |
| 6,608,913 B1 * | 8/2003 | Hinton | B82Y 15/00 382/104 |
| 7,149,346 B2 | 12/2006 | Oniyama | |
| 7,317,456 B1 * | 1/2008 | Lee | G06T 15/08 345/427 |
| 7,804,498 B1 * | 9/2010 | Graham | G06T 11/206 345/419 |

(Continued)

FOREIGN PATENT DOCUMENTS

WO    WO-2016/061267 A1    4/2016

OTHER PUBLICATIONS

3D Surface Mapping, retrieved from http://www.surveygraphics.com.au/our-services-list/3d-surface-mapping/ on Jan. 1, 2017.

(Continued)

*Primary Examiner* — Abderrahim Merouan
(74) *Attorney, Agent, or Firm* — Morgan, Lewis & Bockius LLP; Nathan S. Smith; Kenneth C. Cheney

(57) ABSTRACT

The subject system provides for the generation of a three-dimensional (3D) model from optical capture including the generation of the 3D model from point cloud data migration. The subject system includes generating a point cloud based on optically captured data of a project site. The subject system also includes generating raster information from the point cloud, and creating surface contours based on the raster information. The subject system also includes creating a 3D model based on the surface contours.

20 Claims, 10 Drawing Sheets

(56) References Cited

U.S. PATENT DOCUMENTS

| | | | |
|---|---|---|---|
| 8,422,825 B1 | 4/2013 | Neophytou et al. | |
| 8,818,076 B2 | 8/2014 | Shenkar et al. | |
| 8,958,980 B2 | 2/2015 | Miksa et al. | |
| 9,336,629 B2 | 5/2016 | Finn et al. | |
| 9,400,993 B2 | 7/2016 | Edwards | |
| 2002/0065635 A1 | 5/2002 | Lei et al. | |
| 2002/0123812 A1 | 9/2002 | Jayaram et al. | |
| 2006/0075356 A1* | 4/2006 | Faulkner | G06T 17/05 715/782 |
| 2009/0015585 A1* | 1/2009 | Klusza | G06F 17/3028 345/420 |
| 2011/0102763 A1* | 5/2011 | Brown | G01S 7/481 356/4.01 |
| 2011/0282578 A1* | 11/2011 | Miksa | G06F 17/30241 701/532 |
| 2013/0300740 A1* | 11/2013 | Snyder | G06F 3/016 345/420 |
| 2014/0019179 A1 | 1/2014 | Gosalvez et al. | |
| 2015/0221079 A1* | 8/2015 | Schultz | G06T 7/0004 382/190 |
| 2015/0332504 A1 | 11/2015 | Wang et al. | |
| 2016/0116280 A1* | 4/2016 | Joyce | G01C 11/04 348/144 |
| 2016/0127746 A1* | 5/2016 | Maurer | H04N 19/65 382/232 |
| 2016/0253808 A1* | 9/2016 | Metzler | B64C 39/024 382/103 |
| 2017/0199646 A1* | 7/2017 | Priest | G06F 3/04815 |
| 2017/0301104 A1* | 10/2017 | Qian | G06T 7/70 |
| 2018/0114062 A1* | 4/2018 | Barrier | G06K 9/00651 |

OTHER PUBLICATIONS

Busta, "Three Augmented and Virtual Reality Apps for Design and Construction," Aug. 27, 2015, retrieved from http://www.architectmagazine.com/technology/products/three-augmented-and-virtual-reality-apps-for-design-and-construction_o, 6 pages.

Cannell, "Would You Use Virtual Reality to Renovate Your Home?" Feb. 23, 2016, retrieved from http://www.houzz.com/ideabooks/60554473/list/would-you-use-virtual-reality-to-renovate-your-home, 4 pages.

Fonstad, et al. "Topographic Structure from Motion: a New Development in Photogrammetric Measurement," Earth Surface Processes and Landforms, Jan. 1013, vol. 38, pp. 421-430.

Haala, et al., "Processing of 3D Building Models for Location Aware Applications," 2002, International Archives on Photogrammetry and Remote Sensing IAPRS, vol. XXXIV.

Uysal, et al., "DEM generation with UAV Photogrammetry and accuracy analysis in Sahitler hill," Measurement, 2015, vol. 73, pp. 539-543.

Wayfair Launches Virtual Reality App to Customize Outdoor Spaces with Furnishings and Décor, Aug. 23, 2016 News Release, 3 pages.

Virtual reality offers architects "a whole new way of designing", video retrieved from https://www.youtube.com/watch?v=SLfW2WbpIHE, published Jun. 17, 2016, 1 page.

(How to) Autodesk Revit Import Topography & Building Pad from AutoCAD, video retrieved from https://www.youtube.com/watch?v=1n_f0b9cew4, published Oct. 17, 2013, 1 page.

* cited by examiner

THREE-DIMENSIONAL MODELING FROM OPTICAL CAPTURE

BACKGROUND

Technical Field

The present application relates generally to three-dimensional (3D) models, and more particularly to 3D modeling from optical capture.

Description of the Related Art

When designing a building or other structure on a project site, a 3D model of the project site provides architects and other designers with a virtual project site to aid in design. However, there may be challenges in generating a usable 3D model of the project site.

The virtual project site may first be surveyed, for example a topographic survey. Conventional surveying techniques include laser surveying. Laser surveying involves using a laser scanner. The laser scanner sends out a laser beam all over a field of view of the laser scanner. The laser beam hits a surface and is reflected back to the laser scanner. For every surface that the laser hits, a point in space is recorded. Given the speed at which the laser scanner can capture points, the laser scanner may create a dense point cloud of data.

However, the laser scanner requires line of sight in order to capture points. The laser scanner remains stationary during a scan, which limits the amount of information acquired. In particular, buildings, terrain features, and other obstacles may block views from any given single vantage point. To acquire other views and a complete survey of the project site, the laser scanner must be used from multiple vantage points. Thus, the laser scanner must be moved from vantage point to vantage point in order to build a complete view of the project site using multiple scans.

The multiple scans are later joined together based on reference points or other ways of overlapping the scans to produce a point cloud for the project site. The point cloud represents all the scanned points along the surfaces. The point cloud is a collection of discrete 3D points and requires additional post-processing to generate a 3D model.

SUMMARY

Conventionally, point cloud from the multiple scans of the project site is manually converted into a 3D model by a user creating surfaces from the points. In accordance with at least some embodiments disclosed herein is the realization that this procedure is a time consuming process, and often introduces human error. Further, some embodiments also include the realization that the user may also add surface information, for example, color, to produce the 3D model. In order to do so, the project site would need to be photographed, using different equipment, and the surface information manually added, based on the photographs, to properly obtain the surface information.

Therefore, the present disclosure provides methods for creating a 3D model that significantly reduce the amount of time and cost associated with generating a 3D model. In some comparisons, implementations of the methods disclosed herein enable a 3D model to be generated in much less time at a much lower cost than other methods traditionally available.

Optionally, the method can include capturing optical data of a project site, for instance, with an unmanned aerial vehicle (UAV). When the optical data is captured, a point cloud can be generated based on optically captured data of a project site.

Raster information can be generated from the point cloud. Thereafter, surface contours can be created based on the raster information. Further, a 3D model can be created based on the surface contours.

In some embodiments disclosed herein is a method for creating a 3D model. The method can include generating a point cloud based on optically captured data of a project site. The method can include classifying portions of the point cloud into terrain or above ground. The method can include generating raster information from the point cloud using average cell sampling. The method can include creating surface contours based on the raster information. The method can include creating an orthomosaic based on the optically captured data. The method can include generating a 3D model based on the orthomosaic.

In accordance with at least some embodiments disclosed herein is a method for creating a 3D model. The method can include determining a ground sample distance (GSD). The method can include optically capturing data of a project site based on the GSD. The method can include generating a point cloud based on the optically captured data of the project site. The method can include classifying portions of the point cloud into terrain or above ground. The method can include generating raster information from the point cloud using average cell sampling. The method can include creating surface contours based on the grid information. The method can include creating an orthomosaic based on the optically captured data. The method can include generating a 3D model based on the orthomosaic. The method can include converting the 3D model into a topographical survey.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures.

DETAILED DESCRIPTION

Figure 1:
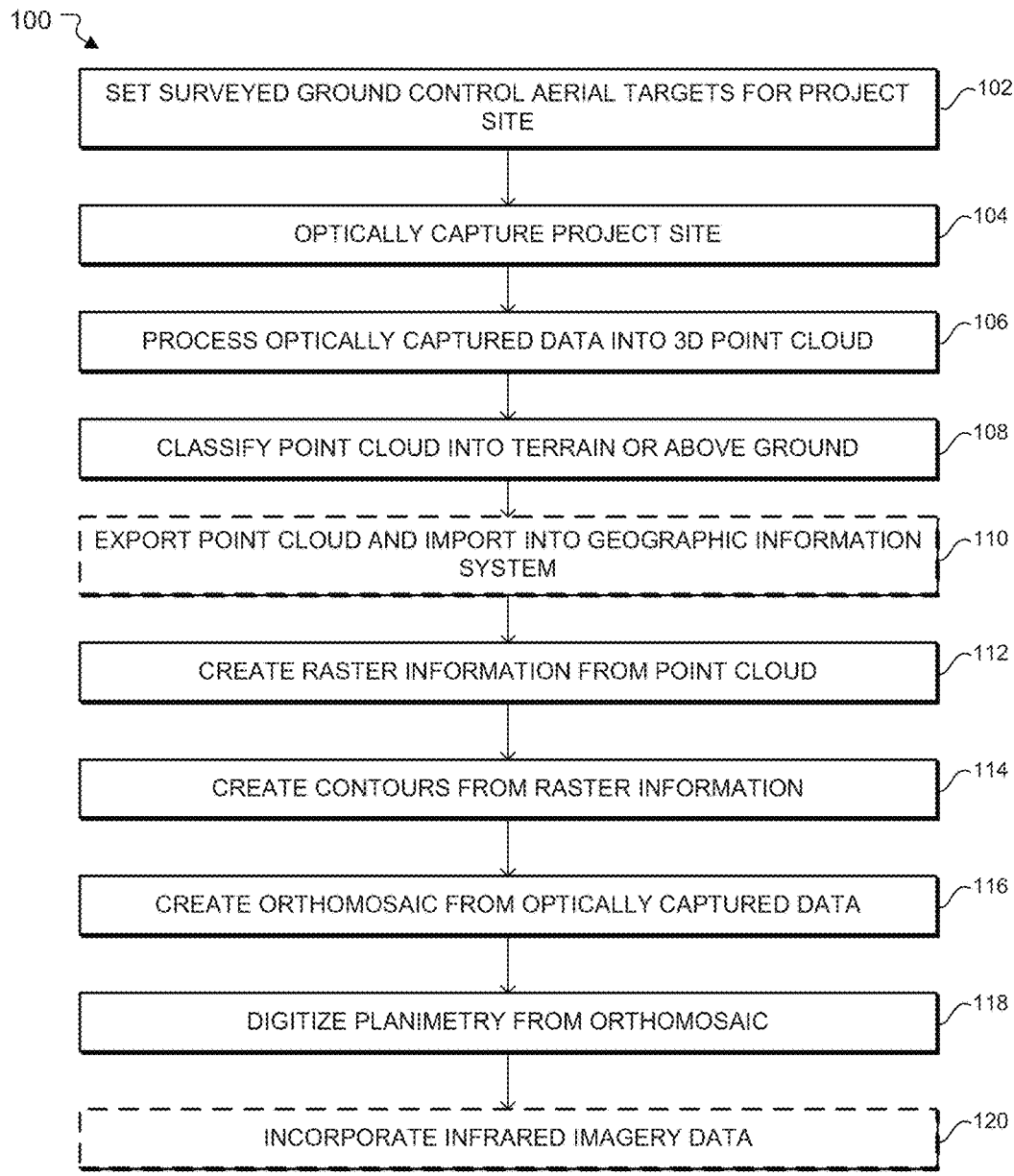
FIG. 1 is a flow chart showing a process of generating a 3D model from optical capture, according to some embodiments.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The disclosed system addresses a problem in traditional 3D modeling tied to computer technology, namely the technical problem of imaging a project site in a three-dimensional coordinate system with surface information in less time and less computing resources than a laser scanning process. The disclosed system provides for creating 3D models based on real-world locations for view simulations and other types of model viewing. The 3D models may be created from optically captured data and integrated in other 3D simulation environments. The disclosed system includes an optical capture engine that is configured to receive and process optical data captured from a real-world project site. In some implementations, a rendering engine may be part of a client to thereby render the 3D model at the client. In other implementations, the rendering engine may be part of a server, and can thereby render the 3D model at the server, which receives the optically captured data from the client. In some aspects, the optically captured data may include metadata that indicates surface information, including surface color information. A rendering engine can generate point cloud information from the optically captured data. Using the point cloud information, the rendering capture engine can generate raster information. The rendering engine can then generate surface contour information from the raster information. The rendering engine can then render the 3D model based on the surface contour information.

The disclosed system further provides improvements to the functioning of the computer itself because it saves data storage space, reduces system loading times and reduces the cost of system resources. Specifically, the use of optically captured data signals helps reduce the system loading latency by having the optically captured data signals include metadata indicating surface information that precludes the need of mapping photographic information to laser-based survey data of the project site. For example, the generation of the raster information and surface contour information from the optically captured data, among others, helps to reduce both data storage space and the cost of system resources because obtaining the surface metadata through the optically captured data precludes the need to process and/or store additional survey data and photograph information as in traditional 3D modeling processes.

Topographic Maps from Optical Capture

When generating a topographic map of a project site using traditional laser scanning techniques, various surveying steps may be required. For instance, the project site is surveyed with a laser scanner, producing a 3D point cloud. This 3D point cloud is then manually converted into a 3D model, which forms the basis of the topographic map. Additional surveys are required for additional information, such as surface information. In contrast, some embodiments disclosed herein provide a method for creating a 3D model that uses optical capture, rather than relying solely on laser surveys. In some implementations, the 3D model may be generated using both the optical capture data and data from one or more laser-based surveys. As used herein, the term "optical capture" refers to the measurement of light that captures a representation of a project site and the conversion of such light into an electrical signal for digital processing. The optical capture data may be obtained using one or more optical sensors, such as a charge-coupled device (CCD) or complementary-metal-oxide-semiconductor (CMOS) devices. The 3D model can be used to generate a topographic map. In accordance with some embodiments, the topographical map can include accurate surface information because the 3D model is based on optically captured data, as discussed further below. The 3D model may be further used to generate other model data. Thus, the subject technology advantageously creates a robust 3D model using less sets of data (e.g., optically captured data rather than laser survey data and additional survey data), which allows the methods disclosed herein to provide faster and better models than that possible using conventional methods. These and other advantages enable the subject technology to substantially improve other areas of technology and industry, as discussed herein.

Now, referring to the drawings, FIG. 1 shows a flowchart 100 of a process for generating a 3D model from optical capture according to some embodiments.

At block 102, surveyed ground control aerial targets are set for the project site. The project site may be, for example, a plot of land that may or may not already have building structures and other structures as well as other natural features. The topography of the project site may also vary, for example, the project site may be flat or its terrain may have various features, including vegetation. The aerial targets may be determined based on the features of the project site, for instance to ensure that the boundaries of the project site are encompassed and that all major features, such as features that are to remain on the project site, are also encompassed when the project site is optically captured. The aerial targets may correspond to physical features of the project site, such as changes in elevation, obstacles, or pre-existing structures, which may block views of the project site at certain angles. The aerial targets may correspond to the boundaries of the project site, for example following parallel to the boundaries. Alternatively, the aerial targets may be mathematically calculated based on project needs and equipment available.

At block 104, the project site is optically captured based on a level of ground sample distance (GSD) and accuracy. For a digital photo of the ground taken from air, a distance between pixel centers corresponds to a distance measured on the ground, which is the GSD. For example, a 10-foot GSD indicates that adjacent pixel image locations are 10 feet apart on the ground. In some aspects, the process receives user input indicating a set of parameters that include a width of the optical sensor, a focal length of the optical sensor, a height of the flight path by the UAV, a width of the images captured, and a height of the images captured. From these parameters, the GSD may be determined including the width and height of a single image footprint on the ground.

The project site may be optically captured, for instance, with an unmanned aerial vehicle (UAV). The UAV may fly around the project site and use a camera (e.g., an optical sensor) to optically capture the project site with a series of photographs or video. A flight path of the UAV may encircle the project site to optically capture the project site at different viewpoints. The flight path may be based on the previously determined aerial targets such that the aerial targets represent waypoints for the UAV. Alternatively, the aerial targets may provide a set of intended targets for the UAV to fly around and optically capture. The flight path of the UAV may be further determined based on the camera and the intended GSD and accuracy. For example, the UAV's camera (and/or focal length available to the camera) may require flight at a certain altitude to achieve the intended GSD. If the camera captures still photographs, the location and orientation of the camera, and when the camera takes each photograph during the flight path may be determined from the aerial targets. Similarly, the orientation of the camera for taking video during the flight path may be determined from the aerial targets. In certain implementations, the aerial targets may dynamically update during the flight path, for example to account for additional project site features, or to ensure that a complete view of the project site is optically captures.

At block 106, the optically captured data is processed into a 3D point cloud. The optically captured data can include several views of the project site, for example as photographs or as still images extracted from video. The optically captured data may be processed using a photogrammetry process to generate the 3D point cloud of the project site. In one or more implementations, the optically captured data includes information such as metadata that indicates one or more properties for a representation of a project site. The properties may include color coordinates, pixel coordinates, brightness, contrast, field-of-view angles, etc. For example, the metadata may provide a mapping between a pixel coordinate and corresponding color information. The metadata may include an identifier for a representation of an object (e.g., a project site structure) in a field of view of the optically captured data.

In contrast to a laser-surveyed point cloud, the 3D point cloud generated from the optically captured data includes the metadata not available in the laser-surveyed point cloud. For instance, surface color information may be available in the 3D point cloud, which is not available in the laser-surveyed point cloud. Moreover, the color information and color patterns, depth and distance information, may generate additional metadata. Surface textures may be determined, which may further generate material information (e.g., cement, dirt, glass, etc.). Certain visually recognizable structures and features may be determined from the metadata, such as buildings, windows, doors, and related information such as window information, door thresholds, building dimensions, sills, etc.

At block 108, portions of the 3D point cloud are classified into terrain versus above ground, using a classification tool. For example, portions of the 3D point cloud that correspond to the ground or terrain may be classified as such, and portions of the 3D point cloud that correspond to a building may be classified as such. The classifications may be broad, such as ground/terrain and above ground/building. The classifications may be granular, such as different types of ground and different types of above ground classifications. Ground classifications may include low vegetation, medium vegetation, high vegetation, water, road surface, etc. Above-ground classifications may include building, rail, wire, tower, bridge deck, etc. In certain implementations, the classifications may be based on the metadata associated with the points of the 3D point cloud.

Optionally at block 110, the 3D point cloud may be exported from the photogrammetry software to a geographic information system (GIS) software. Example GIS software includes ArcGIS. For example, the 3D point cloud may be a LAS file used by Pix4D, which is exported and imported into ArcGIS.

At block 112, raster information is generated from the 3D point cloud. Raster information comprises a matrix of cells or pixels organized as a grid, or rows and columns. Each cell contains data, such as a value, which represents information. The information may relate to elevation, land-use data, soils data, spectral data (e.g., aerial photographs and/or satellite images), temperature, and/or other attributes. Each cell may correspond to a location. Points from the 3D point cloud that are found within a given cell are used to derive the data for the cell. The data for the cell may be interpolated from the values of the points in the cell, for example by using an average value of the points. Other interpolation methods may include using the minimum or maximum value found in the points in the cell, values from the nearest neighbor, inverse distance weighted interpolation, triangulation, or other interpolation methods. In instances where they may be voids, or no points within a cell, the value may be derived from average values from surrounding cells, linear interpolation on a triangulated value, natural neighbor interpolation, or other interpolation. The raster information may be saved as a Grid file, or other type of raster file.

At block 114, contours are created from the raster information. The contours can include contour lines or isolines. A contour line is a curve along which the raster information has a constant value. The contours may be created based on a base contour and a contour interval. The base contour determines how contours are generated for values greater than and less than the base contour to cover the entire range of values of the raster information. The contour interval is the interval between contour lines for the raster information. For example, if the raster information is a Grid file used in ArcGIS, the contours are created from the Grid file. In addition, the contours may be smoothed, for example through averaging of values, filtering, or other processing.

At block 116, an orthomosaic is created. The orthomosaic may be a 2D aerial (e.g., top-down) view of the project site, created from combining multiple photographs from the optically captured data. However, combining photographs from different viewpoints, particularly if the project site is not perfectly flat, may exhibit distortion, for example due to the varying distance between the camera and different points on the ground. To create the orthomosaic, the photographs are orthorectified, or geometrically corrected to remove perspective distortions from the photographs. The orthorectification may use a digital surface model (DSM), such as the contours created at block 114. For example, using Pix4D, an orthorectified site photo can be created.

At block 118, planimetry is digitized from the orthomosaic created at block 116. For example, polygons may be created around features in the orthomosaic, such as buildings, fields, and other types of distinguishable features. Because of the availability of the 3D point cloud as well as associated metadata, the planimetry is accurate and properly scaled. The planimetry may then be converted to a computer-aided design (CAD) format.

Optionally, at block 120, an infrared imagery data is incorporated into the planimetry. The infrared imagery data can include vegetation and soil permeability. The infrared imagery may be collected simultaneously with the optical capturing described above. Alternatively, the infrared imagery may be separately collected, using the UAV or other equipment capable of collecting the infrared imagery.

Figure 2:
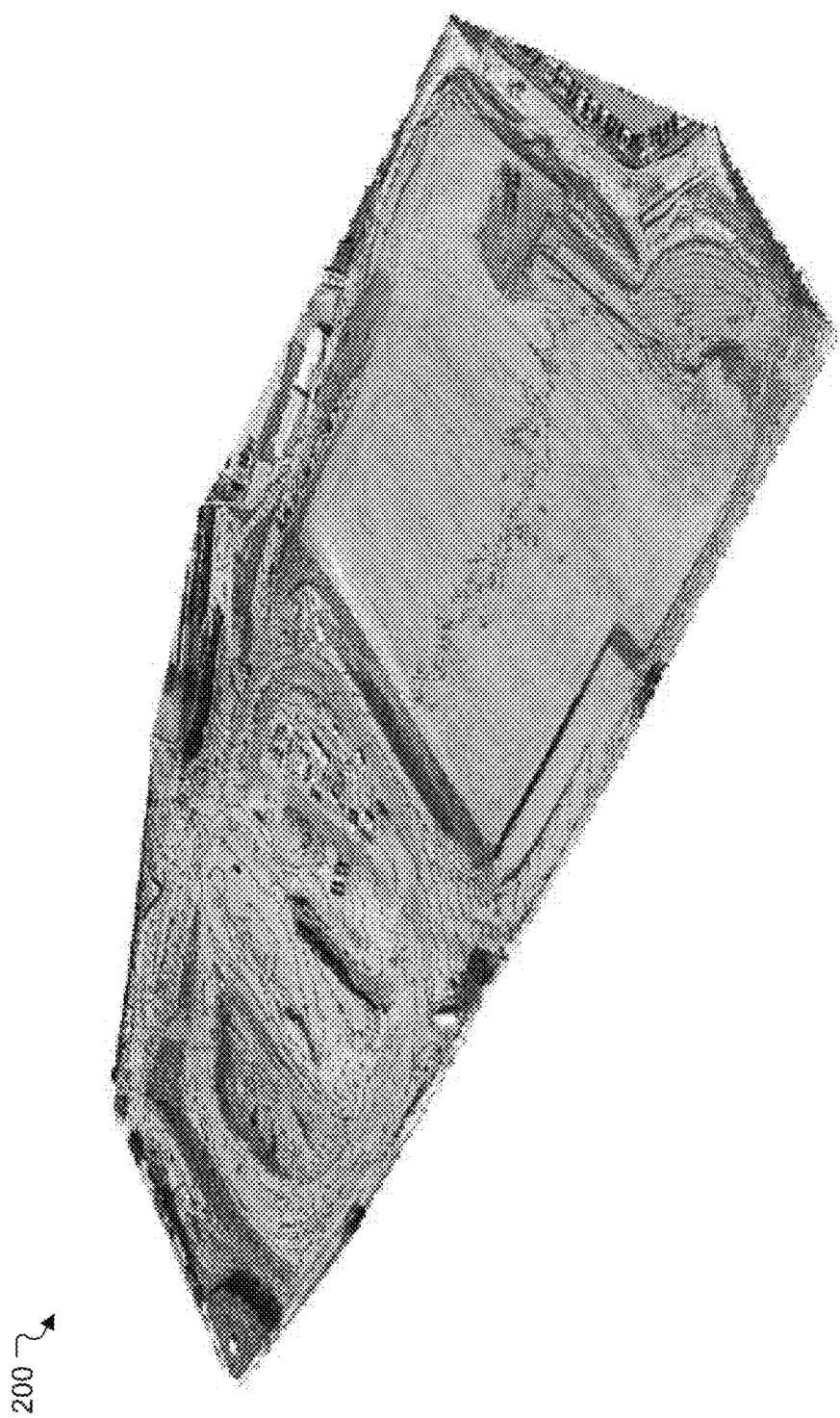
FIG. 2 is a survey map generated from optical capture, according to some embodiments.

The resulting planimetry may comprise survey caliber maps of land surface, "culture" (e.g., trees, rock outcroppings, buildings, structures, etc.) and activities for planning or measurements. FIG. 2 shows a topographic map 200 generated from optically capture data. The topographic map 200 may be used for a volume calculation for an amount of excavation at the project site.

Figure 3:
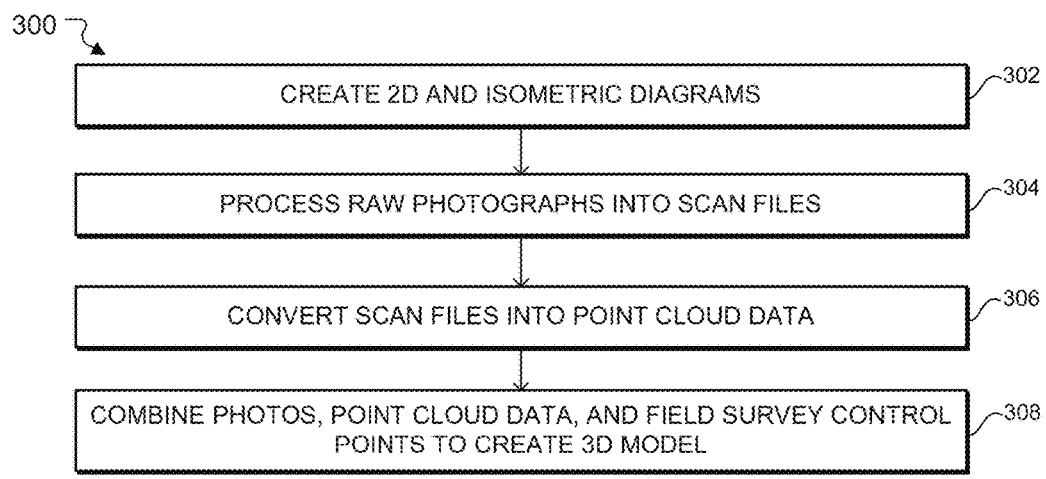
FIG. 3 is a flow chart showing a process of generating a 3D model from optical capture, according to some embodiments.

FIG. 3 shows a flowchart 300 of a process for generating a 3D model from optical capture, according to some other embodiments.

At block 302, 2D diagrams of the project site are created. The project site may include one or more buildings. Isometric diagrams (when needed for multistory or otherwise complex diagrams) may also be created. The diagrams aid in understanding the locations of requested survey point data covering the entire scope of work for GIS to register multiple 3D point clouds, and for accurate modeling of XYZ project information.

At block 304, raw photographs are processed into scan files. The raw photographs may have been optically captured using, for example, a UAV, or other equipment such as cameras at various locations around the project site. The scan files may be a format used for LIDAR scanning, the format including values that correspond to laser pulse information and XYZ location information. The scan files may include information as points detected by LIDAR. The raw photographs are used to create scan files. For example, GIS compiles and processes the raw photographs into LAS files. The LAS files may include classification information for the points in the LAS files.

Figure 4A:
FIG. 4A is an illustration of a point cloud data, according to some embodiments.

At block 306, the scan files are converted into 3D point cloud data. The scan files may be one or more files, each based on an individual scan. The LAS files may be arranged in a dataset. However, the LAS files may need to be converted into a single 3D point cloud. For example, the Revit modeler receives LAS files, indexes and registers them as a RCS file and accompanying RCP file in Recap. FIG. 4A shows a 3D point cloud 400, illustrating how the 3D point cloud is based on optically captured data. The 3D point cloud 400 shows how surface information may be preserved. Rather than continuous surfaces, the 3D point cloud 400 shows a collection of colored points. Each point retains color information from the optically captured data. The colored points are clustered based on the shapes of the surfaces such that buildings, features, and objects are recognizable. However, the 3D point cloud 400 is a collection of discrete points rather than solid shapes.

At block 308, the photographs, 3D point cloud data, and field survey control points are combined to create a 3D electronic model. Using the field survey control points as reference points, the 3D point cloud data forms the basis for the 3D model, converting the points into surfaces, which may utilize the photographs for surface properties. For example, the 3D model may be created in Revit software for immediate use by team architects.

Figure 4B:
FIG. 4B is a 3D model generated from the point cloud of FIG. 4A, according to some embodiments.

FIG. 4B shows a model 450, corresponding to the 3D point cloud 400. Unlike the discrete points in the 3D point cloud 400, the model 450 includes continuous surfaces. BIM 360 Glue, or other tools, may be used to view or share the model 450. As a result of the process illustrated in the flowchart 300, the captured points are processed into a useable file for architectural design.

View Simulations from Optical Capture

Traditionally, view simulations can provide a preview of a building design overlaid on an empty project site. However, creating view simulations is a time-consuming process. Usually, such a rendering of the building design is created by simply adding the rendering of the building into a rendering of the empty project site. Of course, traditional view simulations are usually done only from a single, specific angle or orientation. In contrast to these limited and expensive procedures, some embodiments disclosed herein provide methods for creating view simulations from optically captured data. The view simulations described herein are 3D view simulations, which are more robust in that the view may be rotated, shifted, zoomed, or otherwise manipulated in three dimensions. The view simulations are generated utilizing fewer data sets, and therefore, are faster and more accurate than conventional methods. Thus, the use of the 3D models from optical capture as disclosed in the systems and methods herein provides enhanced computing efficiency compared to traditional methods.

Figure 5:
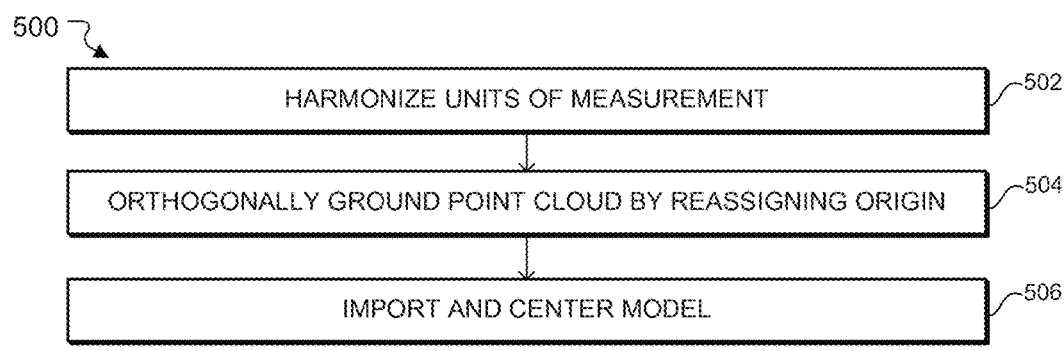
FIG. 5 is a flow chart showing a process of creating a view simulation, according to some embodiments.

FIG. 5 shows a flowchart 500 of a process of generating a view simulation based on optical capture, according to some embodiments.

At block 502, the units of measurement for the 3D point cloud data and building model are harmonized. For example, if the 3D point cloud data file is a RCP or RCS file, Revit will automatically import it in metric units. The units are changed to US units, feet and inches.

At block 504, the 3D point cloud data can be orthogonally grounded by reassigning the origin as needed to correct tilt.

The origin may define x, y, and z axes. The ground plane, which is perpendicular to the z or "up" axis, may also be rotated.

At block 506, a building model is imported and centered in the 3D point cloud data. For example, the building model file may be imported into Revit using "center to center," then moved in XYZ as needed to position the building model appropriately within the project site represented by the 3D point cloud data.

Figure 6A:
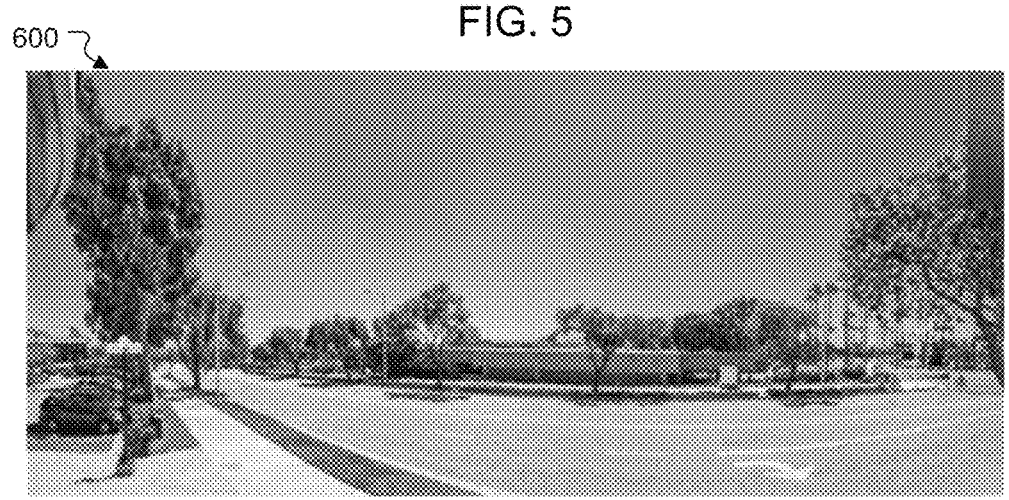
FIG. 6A is a view of a project site, according to some embodiments.
Figure 6B:
FIG. 6B is a view simulation of the project site of FIG. 6A including a proposed building, according to some embodiments.

As a result of the process of the flowchart 500, 3D view simulations of the proposed project are inserted into the actual surrounding environment. FIG. 6A shows a view 600 of a project site. FIG. 6B shows a view 650 of the same project site. However, as seen in FIG. 6B, the view 650 includes a proposed building inserted into the project site.

VR Models

VR models provide 3D view of a building design, such as the interior or exterior of the building design. The building design, particularly the interior, can be furnished with sample virtual furniture. Other design options include colors and materials for walls and other features. The embodiments described herein provide for VR models that may be dynamically changed such that the user may customize the furnishing and design options. The dynamic VR models are generated and changed without requiring additional computing resources than needed for running the VR model.

Figure 7:
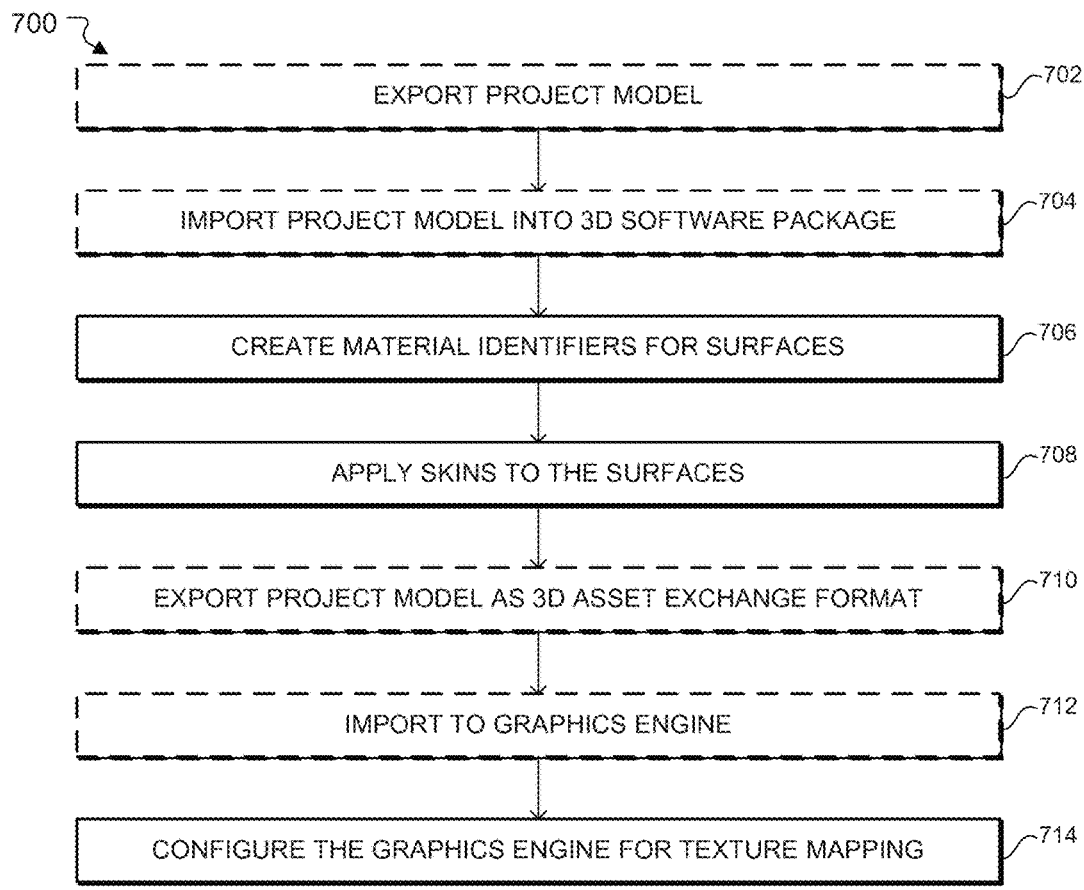
FIG. 7 is a flowchart of a process of generating a virtual reality (VR) model, according to some embodiments.

FIG. 7 shows a flowchart 700 of a process of generating a VR model, according to some embodiments.

Optionally at blocks 702 and 704, the 3D project model is exported from CAD software and imported to a 3D software package. For example, the project model may be exported as a DWG file from Revit. The DWG file may then be imported into a 3D software package such as 3DSMax. Alternatively, the project model may be exported as a Civil Surface file, and imported to 3DSMax.

At block 706, material identifiers (ID) for surfaces of the 3D project model are created. For example, using 3DSMax, material IDs are created by coloring in surfaces. The surfaces may be based on material properties or types, such as colors corresponding to specific surface types. For example, parking lot areas may be dark gray, grassy areas may be green, sidewalks may be light grey, etc. For each new material assigned, a new material ID is created. The material IDs are used by a graphics engine to give the project model the intended materials.

At block 708, skins are applied to the surfaces. The skins may be colors or color patterns to be applied to the surfaces, or may be a texture map, which is an image applied to the surfaces. The application may be based on a texture mapping or other technique for coordinate mapping. For example, UVW mapping may be utilized. Each point in the UVW map corresponds to a point on a surface of an object in the project model. The project model's objects are skinned to provide a 2D representation of the objects' 3D shapes in size and scale in relation to all other objects. Otherwise, without the skinning, the project model may not display the correct materials and textures.

Optionally at blocks 710 and 712, the project model is exported as a 3D asset exchange format, and then imported to a graphics engine. For example, the project model, including the skinning, may be exported as an FBX file. This FBX file may then be imported into a 3D graphics engine, such as Unreal Engine 4.

At block 714, the graphics engine is configured for texture mapping. The texture-mapping configuration allows the graphics engine to render the project model using the skinning applied above. For example, configuring the Unreal Engine (UE) may include creating UE Blueprint scripts for custom texture mapping functionality.

Optionally, artistic qualities may be applied. For example, surfaces may be further tweaked, color, patterns, and/or texture maps may be customized, and other changes for aesthetic value or visual clarity may be applied.

In certain implementations, the custom texture mapping functionality may allow material IDs to change. For example, if a wall was given a material ID corresponding to the color white, the wall's material ID may change to another color, such as grey. Each surface, or a subset of surfaces based on corresponding objects, may be allowed to have changing material IDs. Thus, surfaces may change material IDs to allow viewing the project model with different characteristics.

Figure 8:
FIG. 8 is a view of a VR model, according to some embodiments.

The graphics engine may be used to render the project model for viewing with VR, augmented reality (AR), or other type of viewing. FIG. 8 shows a sample screenshot of viewing an interior project model in VR. As seen in FIG. 8, the VR viewing may include an interface that allows the user to change furnishing or merchandising options of the interior. The user may select colors for objects, such as walls, furniture, doors, etc. The user may be given a menu of specific options to choose from, although in other implementations the interface may be more robust and allow the user to create custom options. The user may be given the option to select furniture and other furnishings, and further select the locations of the furnishings, in addition to the option to select the surface material. The graphics engine may then re-render the model using the user's options, and provide the rendering for display, such as in VR.

The VR model allows for finishing surfaces/hardware, furnishing, and merchandizing for client/consumer viewing. A project model, such as a Revit or Sketchup file, can also be processed into a 3D VR experience by creating a complete outdoor environment. The VR model may be viewed using VR equipment, which may include a stereoscopic headset, and a controller.

Gaze Capture and Quantification

With the VR equipment, the viewer's gaze in the VR model can be tracked. Tracking the viewer's gaze provides an indication as to the popularity of the features in the VR model. The embodiments described herein provide VR model viewing, which can be specifically modified to track the viewer's gaze without utilizing additional computing resources so as to interfere with the VR model viewing. The viewer's gaze is overlaid as a heat map in the VR model.

Figure 9:
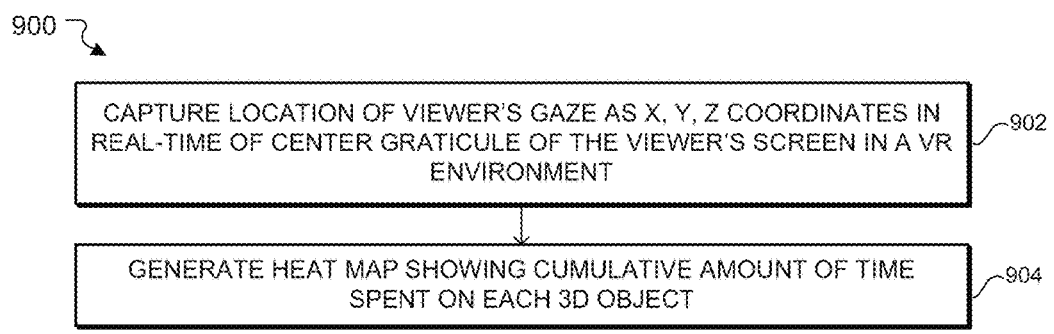
FIG. 9 is a flowchart of a process of gaze capture and quantification, according to some embodiments.

FIG. 9 shows a flowchart 900 for a process of quantifying gaze capture, according to some embodiments.

At block 902, the location of the viewer's gaze is captured as XYZ coordinates in real-time, based on a center graticule of the viewer's screen in a VR environment. For example, as the viewer moves his head to view the project model in 3D, the center graticule also moves. The coordinates that the center graticule is located, as well as time spent on the coordinates, are tracked and stored. The viewer's gaze may be tracked, for example, by sampling the center graticule coordinates periodically, and saving the coordinates and time spent on the coordinates. Alternatively, the viewer's gaze may be tracked as a path, and based on the path, the coordinates and time spent may be determined.

Figure 10A:
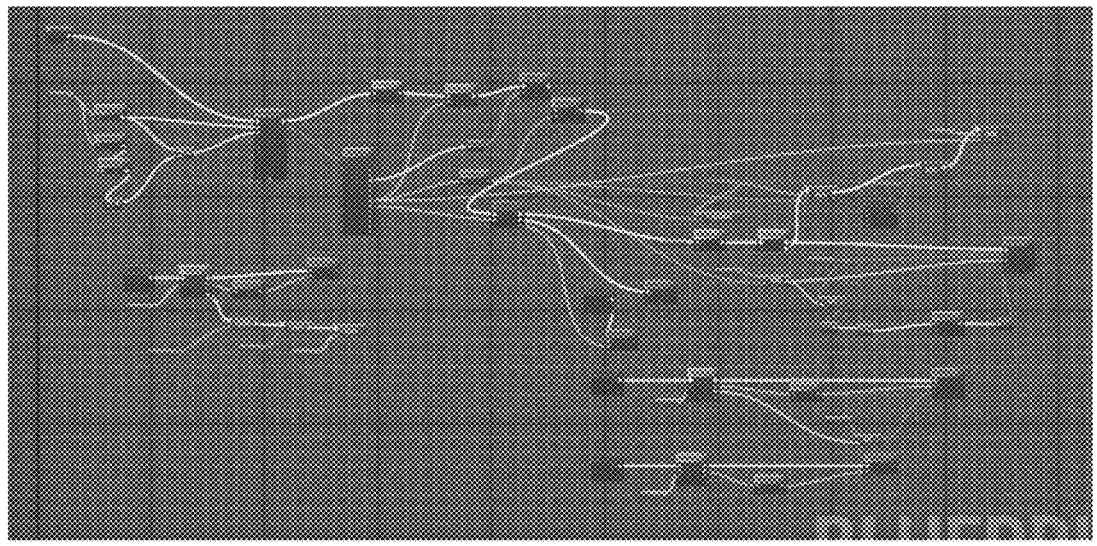
FIG. 10A is a view of a visual scripting system for a 3D engine for generating a heat map that shows cumulative amount of time spent on objects, according to some embodiments.

FIG. 10A shows a chart 1000 of a visual scripting system for a 3D engine, such as Blueprints for the Unreal Engine. The visual scripting system provides a hierarchy for object-oriented (OO) classes or objects in the 3D engine. The nodes correspond to objects, functions, and events in the 3D engine. The events are configured to track the coordinates of the viewer's gaze as it moves across objects. The functions track how much time is spent on each coordinate. In some implementations, the functions may be configured to update colors of the objects in real-time, based on the gaze tracking.

At block 904, a heat map showing the cumulative amount of time spent on each 3D object is generated. The heat map is a 2D view of the project model. The colors correspond to time spent on heat coordinate location. For example, warmer colors (e.g., colors such as red and orange closer to red on the color spectrum) may correspond to longer times spent on the location whereas cooler colors (e.g., colors such as blue, which are closer to violet on the color spectrum) may correspond to shorter times spent on the location. Black may correspond to locations that were not centered on in the viewer's gaze. Each specific location coordinate is given its color independent of other locations. However, in other implementations, the colors may be blended with neighboring locations to produce a visually smoother heat map. Alternatively, all locations corresponding to an object may be all colored the same, such as the warmest color, to clearly distinguish how much time was spent on each object.

Figure 10B:
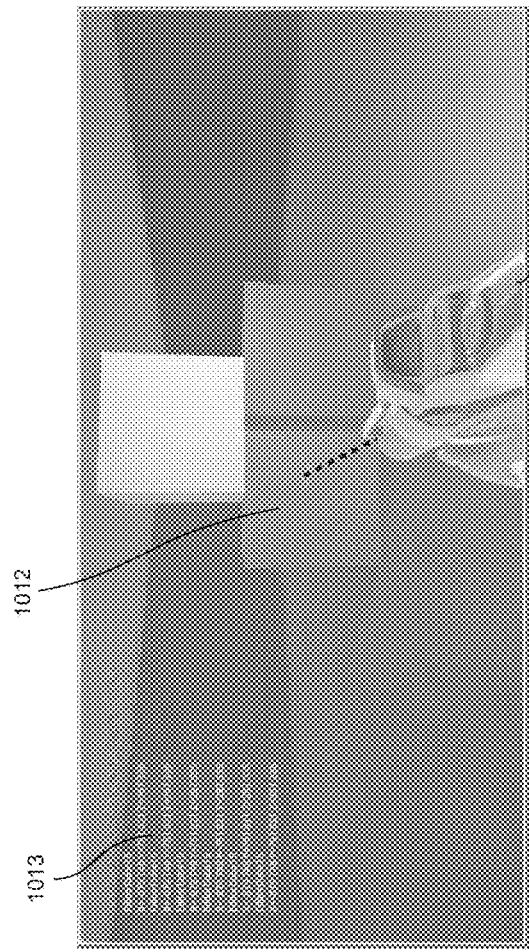
FIG. 10B is a screenshot of viewing objects, tracking coordinates, and coloring the objects, according to some embodiments.
Figure 10C:
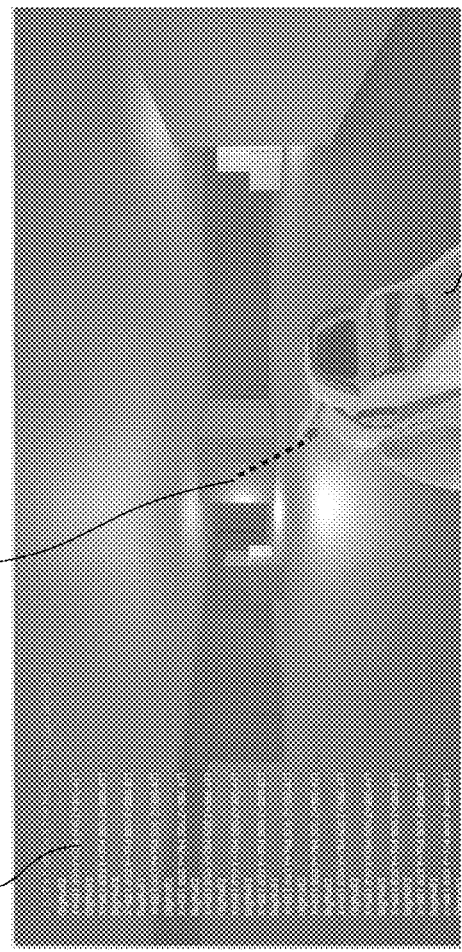
FIG. 10C is another screenshot of viewing objects, tracking coordinates, and coloring the objects, according to some embodiments.

FIGS. 10B and 10C illustrate sample screenshots 1010 and 1020, respectively. The screenshots 1010 and 1020 may be test output screenshots, showing how the coordinates are tracked, and the objects being colored in real-time. The coordinates are tracked, and the corresponding objects associated with the coordinates are recognized. The objects are then colored based on the tracked coordinates. In FIG. 10B, the screenshot 1010 includes a representation of a user-controlled target locator 1011. The user-controlled target locator 1011 may be used to identify and select an object based on a user gaze tracking. The screenshot 1010 also includes target objects 1012 and an output listing of target location coordinates 1013. The target objects 1012 may be color-coded to designate the amount of time a user spent on a particular location. In this example, the object colored red in the target objects 1012 indicates more time spent by a user viewing that particular location as opposed to another object colored blue of the target objects 1012. The output listing of target location coordinates 1013 may include a tally of three-dimensional coordinates (e.g., x, y, z coordinates) identified by the 3D engine using the user gaze tracking information. The output listing of target location coordinates 1013 may be updated with an additional entry (or additional coordinate) each time the 3D engine detects an object from the target objects 1012 being targeted (via the user-controlled target locator 1011). In FIG. 10C, the screenshot 1020 provides a field of view angle that is different from the field of view angle of FIG. 10B. For example, the screenshot 1020 includes a target object 1021 that appears at a farther distance from the point of view of a user. Despite the change in field of view angles, the 3D engine can use the user gaze tracking information with respect to the target object 1021 to update the output listing of target location coordinates 1013.

By tracking, recording, and plotting an image representing the frequency of views at an object in the VR model, homebuilders may learn which features are popular.

Video Simulations Using Camera Tracking

Video simulations are view simulations with video, rather than a still image. In accordance with some embodiments described herein, video simulations can be generated efficiently and quickly using camera tracking techniques. Conventionally, producing a video simulation requires manually creating view simulations for each frame of the video, which may introduce errors in the simulation of the building design. Some embodiments described herein provide methods of generating video simulations and other view simulations using the 3D model based on optical capture. The use of the 3D model not only provides more accurate 3D data, but also increases the efficiency of computing resources, which results in higher quality modeling and lower project cost.

Figure 11:
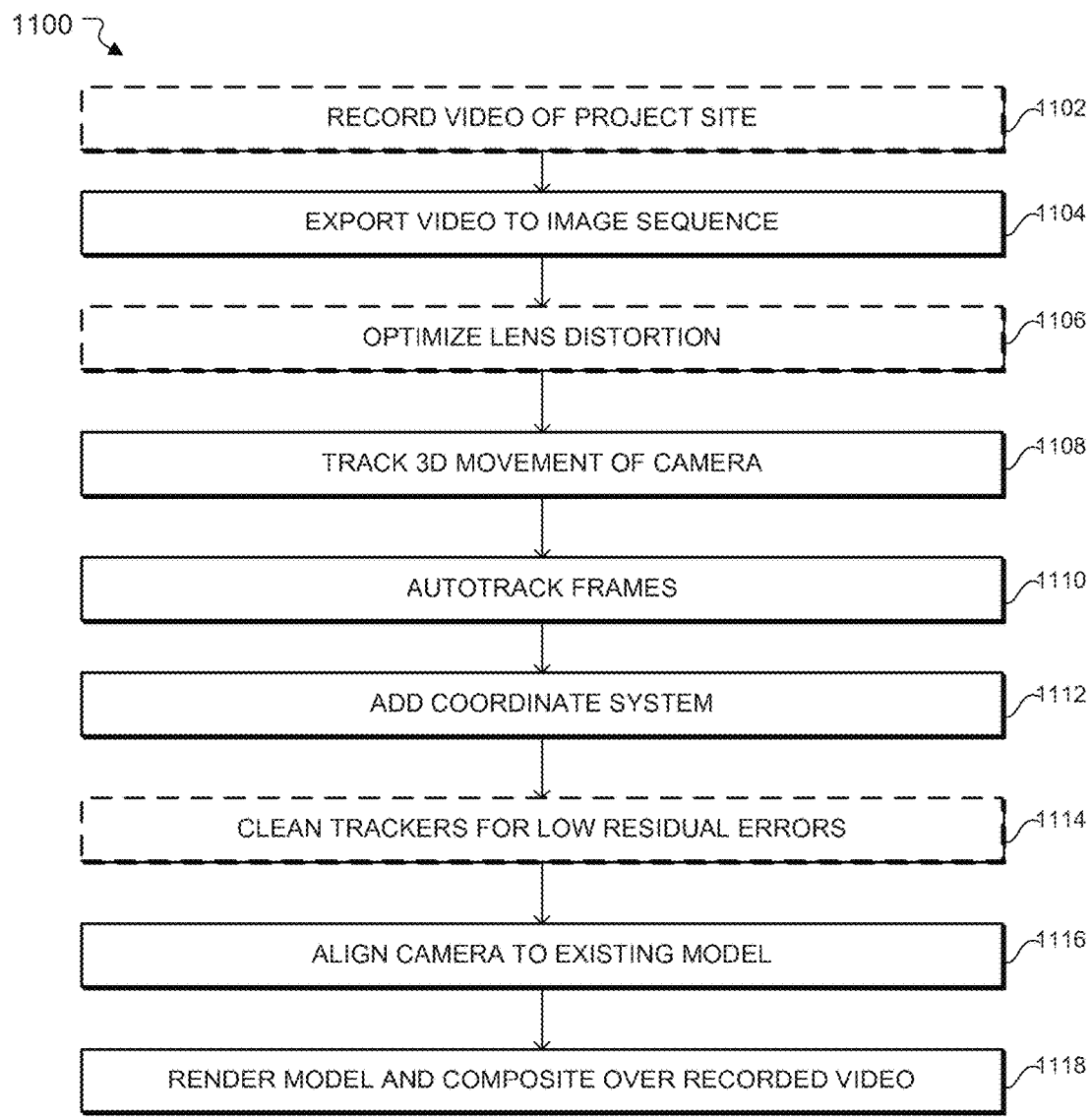
FIG. 11 is a flowchart of generating view simulations using camera tracking, according to some embodiments.

FIG. 11 shows a flowchart 1100 of a process of generating a view simulation using camera tracking, according to some embodiments.

Optionally, at block 1102, video of the project site is recorded. For example, the project site may be recorded by a UAV flying around the project site. Alternatively, pre-recorded video of the project site may be used.

At block 1104, the video is exported as a sequence of images. For example, the video may be exported to an image sequence as TIFF files. TIFF files store raster graphics images, although another file format may be used. Every frame in the video may be exported as an image. Alternatively, the video may be sampled such that less than every frame is exported.

Optionally, at block 1106, lens distortion may be optimized. When the video is recorded, the camera may have used a wide-angle lens in order to capture as much as possible. However, using the wide-angle lens causes barrel distortion. This distortion may affect how the sequence of images is stitched together and the camera movement is tracked. The lens distortion may be optimized using a Camera correction modifier in video editing software such as After Effects, or other similarly capable software.

At block 1108, 3D movement of the camera is tracked. The sequence of images are used to recognize trackers or reference locations in the project site, and determining, based on the views captured in the sequence of images, the camera's movement and orientation as the UAV flew over the project site. For example, SynthEyes or other similar 3D camera tracking software may be used for 3D camera tracking.

At block 1110, frames are autotracked. 2D trackers may be created that follow individual features in the sequence of images. Analyzing the 2D tracks creates the 3D movement tracks.

At block 1112, a coordinate system is added. The coordinate system determines orientation, position, and size of the camera's path in 3D. An origin point and a ground plane may be set in order to establish the coordinate system.

At block 1114, the trackers are cleaned for low residual errors. Bad trackers are identified, which helps removes bumps in the camera path and improves accuracy. The 2D and 3D locations of the trackers are compared to identify the bad trackers. Once the bad trackers are removed, the camera path may be re-solved.

At block 1116, the camera path is aligned to the project model. For example, the camera path may be imported to 3DSMax and aligned to the existing model in 3DSMax. The existing model is rendered as video based on the imported camera path. This model rendering may then be combined with the recorded video, for example by superimposing the model rendering over the recorded video. The composite video includes existing footage of the project site with proposed conditions, such as a proposed building.

At block 1118, the model, including the proposed conditions, is rendered and composited over the recorded video. UAV video is camera tracked and converted to a virtual 3D camera, which is then used to render proposed conditions and composite over existing footage.

Blending 3D Point Cloud Data and Engineering Plans into BIM Model

Various software platforms, such as civil engineering software, CAD software, BIM software, and other 3D software, use specific data in specific formats. Typically, a building design project may incorporate various stages of design, such as electrical layout, plumbing layout, building layout, etc. in a BIM model. According to some embodiments disclosed herein is the realization that the various software suites may be inherently incompatible with each other, resulting in increased difficulty in collaboration between professionals, possible loss of data, or inefficient use of resources or costly overages to convert or otherwise manipulate data. Accordingly, some embodiments described herein can advantageously enable professionals to achieve full project interoperability and use multiple platforms or data sources, for example, by sharing coordinate values. Thus, in some embodiments, the sharing of coordinate values can mitigate the need to recreate or reformat data between the software platforms.

Figure 12:
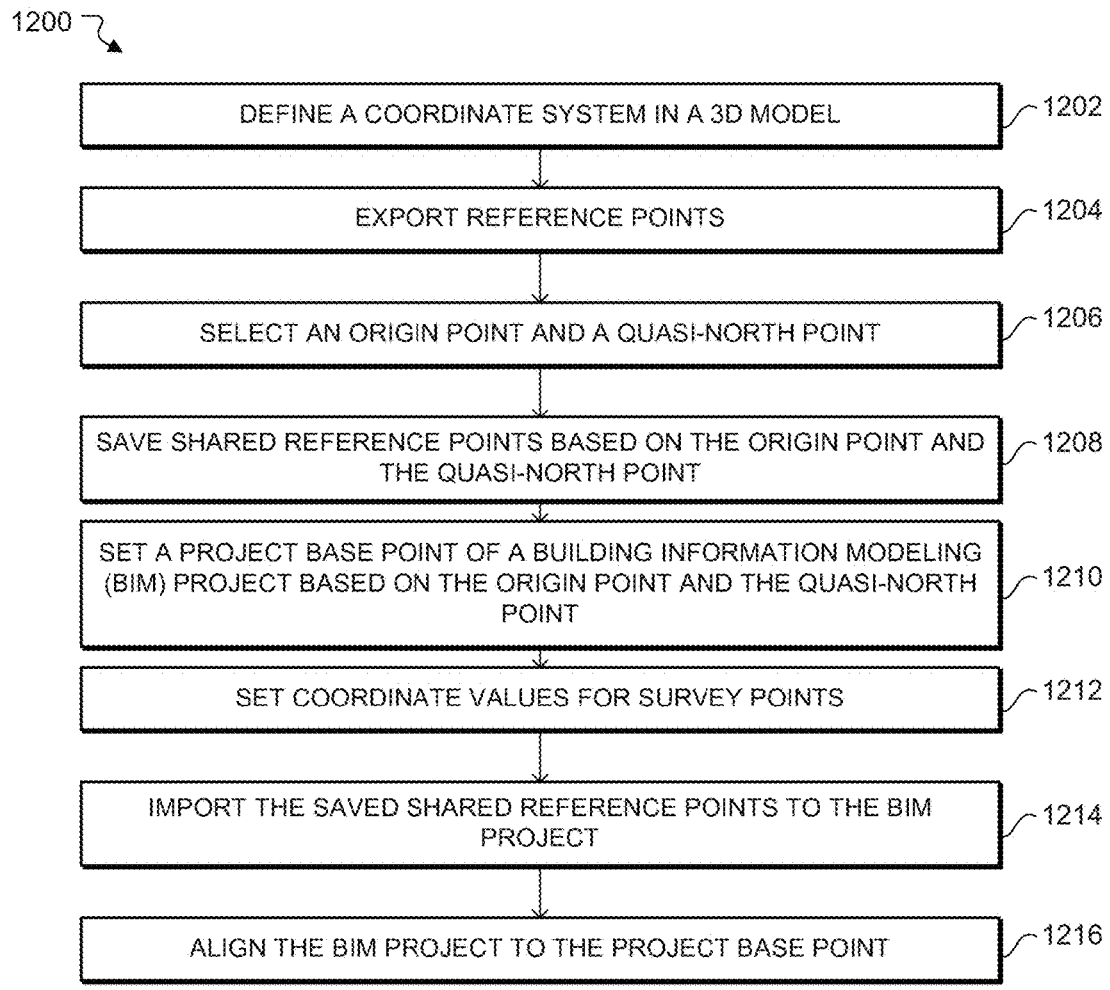
FIG. 12 is a flow chart showing a process of blending point cloud data into a building information modeling (BIM) project, according to some embodiments.

In accordance with some embodiments, a defined coordinate system is obtained to be used for the BIM project. The coordinate values are shared with the software, including point cloud software, Revit, and Civil 3D. Once the coordinate values have been shared and acquired, a uniform BIM project may be utilized to assure all disciplines are able to exchange data easily and accurately. FIG. 12 shows a flowchart 1200 of a process for blending 3D point cloud data into a BIM model.

At block 1202, a coordinate system is defined in a 3D model. For example, in a Civil 3D project, the coordinate system may be defined within the Civil 3D drawing.

At block 1204, reference points are exported. For example, the reference points may be exported for Revit.

At block 1206, an origin point and a quasi-north point is selected. Exporting the reference points include defining an origin point with XYZ values, and selecting a point on the +Y axis for selecting the quasi-north point. The selected coordinates are confirmed, which includes confirming the origin XYZ values, and confirming rotation in the XY plane, in decimal degrees.

At block 1208, shared reference points based on the origin point and the quasi-north point are saved. The shared reference points may be saved as an extensible markup language (XML) file.

At block 1210, a project base point of a BIM project is set based on the origin point and the quasi-north point. More specifically, North/South coordinate values are set based on the origin Y value, and East/West coordinate values are set based on the origin X value.

At block 1212, coordinate values for survey points are set. The survey points may also be set according to the origin values, similar to the project base point. For each survey point, block 1210 may be repeated.

At block 1214, the saved shared reference points are imported to the BIM project. For example, the saved shared reference points are imported from the XML file saved at block 1208.

At block 1216, the BIM project is aligned to the project base point. The origin point for the BIM project is set to the project base point. A point on the +Y direction is selected to align to. The XML file is selected and the shared coordinates are confirmed.

As a result, the completed BIM project includes civil engineering plans and landscape plans.

Figure 13:
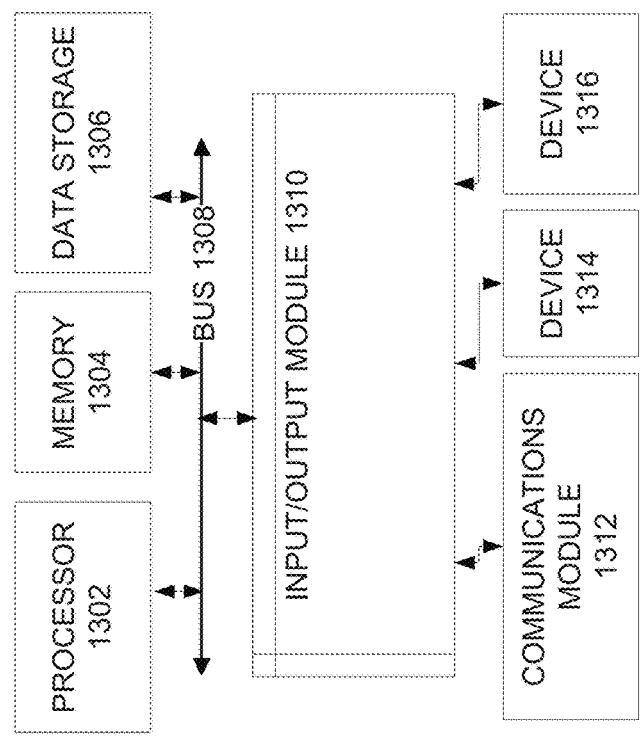
FIG. 13 is a block diagram illustrating an example computer system, according to some embodiments.

FIG. 13 is a block diagram 1300 illustrating an example server 1330 and client 1310 in the architecture 1300 of FIG. 13 according to certain aspects of the disclosure. The client 1310 may represent the camera or the UAV of FIG. 1 and the server 1330 may represent a client-computing device in some implementations, or the client 1310 may represent the client-computing device and the server 1330 may represent off-site computing facilities in other implementations.

The client 1310 and the server 1330 are connected over the network 1350 via respective communications modules 1318 and 1338. The communications modules 1318 and 1338 are configured to interface with the network 1350 to send and receive information, such as data, requests, responses, and commands to other devices on the network. The communications modules 1318 and 1338 can be, for example, modems or Ethernet cards.

The server 1330 includes a memory 1332, a processor 1336, and a communications module 1338. The memory 1332 of the server 1330 includes a server application 1333. The processor 1336 of the server 1330 is configured to execute instructions, such as instructions physically coded into the processor 1336, instructions received from software in the memory 1332, or a combination of both. The memory 1332 includes a server application 1333. The processor 1336 of the server 1330 executes instructions from the server application 1333 causing the processor 1336 to process optically captured data signals received from the client 1310 over the network 1350 in order to generate a 3D model of a project site using raster information and surface contour information from the optically captured data. The memory 1332 includes a graphics engine 1334 that is configured to receive and process the optically captured data. The graphics engine 1334 may be configured to generate point cloud information from the optically captured data. Using the point cloud information, the graphics engine 1334 can generate raster information. The graphics engine 1334 can then generate surface contour information from the raster information. The graphics engine 1334 can then render the 3D model based on the surface contour information.

The memory 1332 also includes modeling data 1335. The modeling data 1335 may include the optically captured data received from the client 1310 over the network 1350. In some aspects, the server 1330 may post-process the optically captured data that may be stored in the modeling data 1335. The modeling data 1335 may include the point cloud information generated from the optically captured data. The modeling data 1335 also may include the raster information generated from the point cloud information. The modeling data 1335 may include the surface contour information generated from the raster information. In some aspects, the modeling data 1335 may include an orthomosaic associated with the optically captured data and/or infrared imagery data received from the client 110 over the network 150.

The client 1310 includes a processor 1312, the communications module 1318, and the memory 1320 that includes an application 1322. The client 1310 also includes an optical capture engine 1324 and an optical sensor 1326 (e.g., a camera). The application 1322 may be a 3D modeling tool, or physically coded instructions that execute a rendering of a 3D model using image data that is optically captured through the optical sensor 1326. The client 1310 also includes an input device 1316, such as a keyboard, mouse, touchscreen and/or game controller, and an output device 1314, such as a display. The input device 1316 may include an optical sensor device that is part of the optical sensor 1326 in some implementations, or may include an optical sensor device that is separate from the optical sensor 1326 in other implementations. In some aspects, the processor 1312 receives user input via the input device 1316, where the user input indicates additional information about the project site and/or user values for parameters of the 3D model rendering.

The processor 1312 of the client 1310 is configured to execute instructions, such as instructions physically coded into the processor 1312, instructions received from software in the memory 1320, or a combination of both. The processor 1312 of the client 1310 executes instructions from the application 1322 causing the processor 1312 to run a process that generates a 3D model from optically captured data.

The processor 1312, using the application 1322 and the optical capture engine 1324, may obtain image data that is optically captured using the optical sensor 1326. The processor 1312, using the application 1322 and the optical capture engine 1324, may generate point cloud information from the optically captured data. In some aspects, the client 110 may transmit the optically captured data to the server 1330 over the network 1350. Now turning to the server 1330, the processor 1336, using the server application 1333 and the graphics engine 1334, may process the optically captured data into a 3D point cloud. In some aspects, the processor 1336, using the graphics engine 1334, may export the 3D point cloud for importing into a geographic information system. The memory 1332 may include a process associated with the geographic information system. The processor 1336, using the graphics 1334, may generate raster information from the 3D point cloud, and generate surface contour information from the raster information. The processor 1336, using the graphics 1334, may generate the 3D model using an orthomosaic from the optically captured data and/or the surface contour information. In turn, the server 1330 may transmit the generated 3D model to the client 1310 for display via the output device 1314.

FIG. 14 is a block diagram illustrating an example computer system 1400. In certain aspects, the computer system 1400 may be implemented using hardware or a combination of software and hardware, either in a dedicated server, or integrated into another entity, or distributed across multiple entities.

Computer system 1400 can include a bus 1408 or other communication mechanism for communicating information, and a processor 1402 coupled with bus 1408 for processing information. According to one aspect, the computer system 1400 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 1400 may be implemented with one or more processors 1402. Processor 1402 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 1400 can include, in addition to hardware, code that creates an execution environment for the computer program in question, e.g., code that constitutes processor firmware, a protocol stack, a database management system, an operating system, or a combination of one or more of them stored in an included memory 1404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry. Expansion memory may also be provided and connected to computer system 1400 through input/output module 1410, which may include, for example, a SIMM (Single In-Line Memory Module) card interface. Such expansion memory may provide extra storage space for computer system 1400, or may also store applications or other information for computer system 1400. Specifically, expansion memory may include instructions to carry out or supplement the processes described above, and may include secure information also. Thus, for example, expansion memory may be provided as a security module for computer system 1400, and may be programmed with instructions that permit secure use of computer system 1400. In addition, secure applications may be provided via the SIMM cards, along with additional information, such as placing identifying information on the SIMM card in a non-hackable manner.

The instructions may be stored in the memory 1404 and implemented in one or more computer program products, i.e., one or more modules of computer program instructions encoded on a computer readable medium for execution by, or to control the operation of, the computer system 1400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 can further include a data storage device 1406 such as a magnetic disk or optical disk, coupled to bus 1408 for storing information and instructions. Computer system 1400 may be coupled via input/output module 1410 to various devices. The input/output module 1410 can be any input/output module. Example input/output modules 1410 include data ports such as USB ports. In addition, input/output module 1410 may be provided in communication with processor 1402, so as to enable near area communication of computer system 1400 with other devices. The input/output module 1410 may provide, for example, for wired communication in some implementations, or for wireless communication in other implementations, and multiple interfaces may also be used. The input/output module 1410 is configured to connect to a communications module 1412. Example communications modules 1412 include networking interface cards, such as Ethernet cards and modems.

The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 1412 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 1412 sends and receives electrical, electromagnetic, or optical signals that carry digital data streams representing various types of information. The network link typically provides data communication through one or more networks to other data devices. For example, the network link of the communications module 1412 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 1412, which carry the digital data to and from computer system 1400, are example forms of transmission media.

Computer system 1400 can send messages and receive data, including program code, through the network(s), the network link and communications module 1412. In the Internet example, a server might transmit a requested code for an application program through Internet, the ISP, the local network, and communications module 1412. The received code may be executed by processor 1402 as it is received, and/or stored in data storage 1406 for later execution.

In certain aspects, the input/output module 1410 is configured to connect to a plurality of devices, such as an input device 1414 and/or an output device 1416. Example input devices 1414 include a keyboard and a pointing device, e.g., a mouse or a trackball, by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1416 include display devices, such as a LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 1416 may comprise appropriate circuitry for driving the output device 1416 to present graphical and other information to a user.

According to one aspect of the present disclosure, the processes described herein can be implemented using a computer system 1400 in response to processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 1400 can include clients and servers. A client and server are generally remote from each other and typically interact through a communication network. The relationship of client and server arises by virtue of computer programs running on the respective computers and having a client-server relationship to each other. Computer system 1400 can be, for example, and without limitation, a desktop computer, laptop computer, or tablet computer. Computer system 1400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1402 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 1406. Volatile media include dynamic memory, such as memory 1404. Transmission media include coaxial cables, copper wire, and fiber optics, including the wires that comprise bus 1408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 1408. Transmission media can also take the form of acoustic or light waves, such as those generated during radio wave and infrared data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A computer-implemented method comprising generating a point cloud based on optically captured data of a project site; generating raster information from the point cloud; creating surface contours based on the raster information; and creating a three-dimensional (3D) model based on the surface contours.

Clause 2. The computer-implemented method of clause 1, further comprising: ortho-rectifying the 3D model; and converting the 3D model into a topographical survey.

Clause 3. The computer-implemented method of clause 2, further comprising: adding vegetation and soil permeability information to the topographical survey based on infrared imagery data of the project site.

Clause 4. The computer-implemented method of clause 1, wherein the point cloud comprises metadata based on the optically captured data.

Clause 5. The computer-implemented method of clause 4, wherein the metadata comprises surface color.

Clause 6. The computer-implemented method of clause 4, wherein the surface contours include properties based on the metadata.

Clause 7. The computer-implemented method of clause 1, wherein the 3D model comprises a building model.

Clause 8. The computer-implemented method of clause 7, wherein the building model comprises building metadata.

Clause 9. The computer-implemented method of clause 8, wherein the building metadata comprises one or more of window information, door thresholds, building dimensions, and sills.

Clause 10. The computer-implemented method of clause 1, further comprising: determining ground control aerial targets of the project site; determining a ground sample distance (GSD), the GSD indicating a mapping between pixel locations of the optically captured data and surface locations of the project site; and optically capturing the optically captured data based on the ground control aerial targets and the GSD.

Clause 11. The computer-implemented method of clause 1, further comprising classifying portions of the point cloud into terrain portions and above-ground portions.

Clause 12. The computer-implemented method of clause 1, further comprising creating an orthomosaic based on the optically captured data.

Clause 13. The computer-implemented method of clause 12, wherein creating the 3D model comprises converting the orthomosaic into the 3D model.

Clause 14. A system comprising: one or more processors; and a computer-readable storage medium coupled to the one or more processors, the computer-readable storage medium including instructions that, when executed by the one or more processors, cause the one or more processors to:

generate a point cloud based on optically captured data of a project site; classify portions of the point cloud into terrain or above ground; generate raster information from the point cloud using average cell sampling; create surface contours based on the raster information; create an orthomosaic based on the optically captured data; and generate a three-dimensional (3D) model based on the orthomosaic.

Clause 15. The system of clause 14, wherein the instructions further cause the one or more processors to: ortho-rectify the 3D model; convert the 3D model into a topographical survey; and add vegetation and soil permeability information to the topographical survey based on infrared imagery data of the project site.

Clause 16. The system of clause 14, wherein the point cloud comprises metadata based on the optically captured data, the metadata including surface color.

Clause 17. The system of clause 14, wherein the instructions further cause the one or more processors to: determine ground control aerial targets of the project site; determine a ground sample distance (GSD); and optically capture the optically captured data based on the ground control aerial targets and the GSD.

Clause 18. A non-transitory computer readable storage medium coupled to a processor, the non-transitory computer readable storage medium including instructions that, when executed by the processor, cause the processor to: determine a ground sample distance (GSD); optically capture data of a project site based on the GSD; generate a point cloud based on the optically captured data of the project site; classify portions of the point cloud into terrain or above ground; generate raster information from the point cloud using average cell sampling; create surface contours based on the grid information; create an orthomosaic based on the optically captured data; generate a three-dimensional (3D) model based on the orthomosaic; and convert the 3D model into a topographical survey.

Clause 19. The non-transitory computer readable storage medium of clause 18, wherein converting the 3D model into the topographical survey comprises ortho-rectifying the 3D model.

Clause 20. The non-transitory computer readable storage medium of clause 18, wherein the instructions further cause the processor to: capture infrared imagery data of the project site; and add vegetation and soil permeability information to the topographical survey based on the infrared imagery data.

Clause 21. A computer-implemented method comprising: defining a coordinate system in a three-dimensional (3D) model; selecting an origin point; confirming a quasi-north point; saving shared reference points based on the origin point and the quasi-north point; setting a project base point of a building information modeling (BIM) project based on the origin point and the quasi-north point; setting coordinate values for survey points; importing the saved shared reference points to the BIM project; and aligning the BIM project to the project base point.

Clause 22. The computer-implemented method of Clause 21, further comprising importing the 3D model into the BIM project based on the aligning.

Clause 23. A computer-implemented method comprising: defining a coordinate system in a three-dimensional (3D) model; exporting reference points; selecting an origin point; confirming a quasi-north point; saving shared reference points based on the origin point and the quasi-north point; setting a project base point of a building information modeling (BIM) project based on the origin point and the quasi-north point; setting coordinate values for survey points; importing the saved shared reference points to the BIM project; and aligning the BIM project to the project base point.

Clause 24. The computer-implemented method of Clause 23, wherein the origin point includes X, Y, and Z values.

Clause 25. The computer-implemented method of Clause 24, wherein setting the project base point of the BIM project comprises setting the project base point based on the X value and the Y value of the origin point.

Clause 26. The computer-implemented method of Clause 23, wherein the quasi-north point includes a point selected on a +Y axis of the 3D model.

Clause 27. The computer-implemented method of Clause 23, wherein confirming the quasi-north point comprises confirming a rotation in an XY plane of the 3D model.

Clause 28. The computer-implemented method of Clause 23, wherein saving the shared reference points comprises saving the origin point and the quasi-north point in an extensible markup language (XML) file.

Clause 29. The computer-implemented method of Clause 28, wherein importing the saved shared reference points comprises importing the XML file.

Clause 30. The computer-implemented method of Clause 23, wherein the coordinate values for the survey points are set based on the origin point.

Clause 31. The computer-implemented method of Clause 23, wherein aligning the BIM project to the project base point further comprises setting a BIM project origin point to the project base point.

Clause 32. The computer-implemented method of Clause 23, wherein aligning the BIM project to the project base point further comprises selecting a point in a +Y direction in the BIM project.

Clause 33. The computer-implemented method of Clause 32, wherein aligning the BIM project to the project base point further comprises aligning the BIM project based on the selected point in the +Y direction in the BIM project.

Clause 34. The computer-implemented method of Clause 23, further comprising confirming coordinate values of the imported reference points.

Clause 35. A system comprising: one or more processors; and a computer-readable storage medium coupled to the one or more processors, the computer-readable storage medium including instructions that, when executed by the one or more processors, cause the one or more processors to: define a coordinate system in a three-dimensional (3D) model; export reference points; save shared reference points based on the reference points; set a project base point of a building information modeling (BIM) project based on the reference points; set coordinate values for survey points; import the saved reference points to the BIM project; and align the BIM project to the project base point.

Clause 36. The system of Clause 35, wherein the instructions further cause the one or more processors to select an origin point.

Clause 37. The system of Clause 36, wherein the origin point includes X, Y, and Z values.

Clause 38. The system of Clause 35, wherein setting the project base point of the BIM project comprises setting the project base point based on the X value and the Y value of the origin point.

Clause 39. The system of Clause 36, wherein the instructions further cause the one or more processors to confirm a quasi-north point.

Clause 40. The system of Clause 39, wherein the quasi-north point includes a point selected on a +Y axis of the 3D model.

Clause 41. The system of Clause 39, wherein confirming the quasi-north point comprises confirming a rotation in an XY plane of the 3D model.

Clause 42. The system of Clause 39, wherein saving the shared reference points comprises saving the origin point and the quasi-north point in an extensible markup language (XML) file.

Clause 43. The system of Clause 42, wherein importing the saved shared reference points comprises importing the XML file.

Clause 44. The system of Clause 36, wherein the coordinate values for the survey points are set based on the origin point.

Clause 45. The system of Clause 35, wherein aligning the BIM project to the project base point further comprises setting a BIM project origin point to the project base point.

Clause 46. The system of Clause 35, wherein aligning the BIM project to the project base point further comprises selecting a point in a +Y direction in the BIM project.

Clause 47. The system of Clause 46, wherein aligning the BIM project to the project base point further comprises aligning the BIM project based on the selected point in the +Y direction in the BIM project.

Clause 48. The system of Clause 35, wherein the instructions further cause the one or more processors to confirm coordinate values of the imported reference points.

Clause 49. A non-transitory computer readable storage medium coupled to a processor, the non-transitory computer readable storage medium including instructions that, when executed by the processor, cause the processor to: define a coordinate system in a three-dimensional (3D) model; export reference points; set a project base point of a building information modeling (BIM) project based on the reference points; set coordinate values for survey points; import the saved shared reference points to the BIM project; and align the BIM project to the project base point.

Clause 50. The non-transitory computer readable storage medium of Clause 49, wherein the instructions further cause the processor to select an origin point.

Clause 51. The non-transitory computer readable storage medium of Clause 50, wherein the origin point includes X, Y, and Z values.

Clause 52. The non-transitory computer readable storage medium of Clause 51, wherein setting the project base point of the BIM project comprises setting the project base point based on the X value and the Y value of the origin point.

Clause 53. The non-transitory computer readable storage medium of Clause 50, wherein the instructions further cause the processor to confirm a quasi-north point.

Clause 54. The non-transitory computer readable storage medium of Clause 53, wherein the quasi-north point includes a point selected on a +Y axis of the 3D model.

Clause 55. The non-transitory computer readable storage medium of Clause 53, wherein confirming the quasi-north point comprises confirming a rotation in an XY plane of the 3D model.

Clause 56. The non-transitory computer readable storage medium of Clause 53, wherein the instructions further cause the processor to save shared reference points based on the origin point and the quasi-north point.

Clause 57. The non-transitory computer readable storage medium of Clause 56, wherein saving the shared reference points comprises saving the origin point and the quasi-north point in an extensible markup language (XML) file.

Clause 58. The non-transitory computer readable storage medium of Clause 57, wherein importing the saved shared reference points comprises importing the XML file.

Clause 59. The non-transitory computer readable storage medium of Clause 50, wherein the coordinate values for the survey points are set based on the origin point.

Clause 60. The non-transitory computer readable storage medium of Clause 49, wherein aligning the BIM project to the project base point further comprises setting a BIM project origin point to the project base point.

Clause 61. The non-transitory computer readable storage medium of Clause 49, wherein aligning the BIM project to the project base point further comprises selecting a point in a +Y direction in the BIM project.

Clause 62. The non-transitory computer readable storage medium of Clause 61, wherein aligning the BIM project to the project base point further comprises aligning the BIM project based on the selected point in the +Y direction in the BIM project.

Clause 63. The non-transitory computer readable storage medium of Clause 49, wherein the instructions further cause the processor to confirm coordinate values of the imported reference points.

Clause 64. A computer-implemented method comprising: creating image information of a project site; creating point cloud data from the image information of the project site; and generating a three-dimensional (3D) model based on the image information and the point cloud data.

Clause 65. The computer-implemented method of Clause 64, further comprising creating an isometric diagram of the project site.

Clause 66. The computer-implemented method of Clause 65, wherein the 3D model is further based on the isometric diagram.

Clause 67. The computer-implemented method of Clause 65, wherein the isometric diagram includes a multistory building.

Clause 68. The computer-implemented method of Clause 65, wherein the isometric diagram includes field control points.

Clause 69. The computer-implemented method of Clause 68, wherein the 3D model is further based on the field control points.

Clause 70. A computer-implemented method comprising: reassigning an origin of point cloud data to orthogonally ground the point cloud data; importing building model data to the point cloud data; and centering the building model data.

Clause 71. The computer-implemented method of Clause 70, further comprising changing units of measurement in the point cloud data.

Clause 72. The computer-implemented method of Clause 70, wherein reassigning the origin corrects a tilt in the point cloud data.

Clause 73. A computer-implemented method comprising: creating material identifiers (ID) for a three-dimensional (3D) model; assigning the material IDs to a plurality of surfaces of the 3D model; applying skins corresponding to the material IDs to the plurality of surfaces based on the assigning; and displaying the 3D model with the applied skins.

Clause 74. The computer-implemented method of Clause 73, wherein the material IDs are based on colors and textures.

Clause 75. The computer-implemented method of Clause 73, wherein applying skins further comprises rendering a two-dimensional (2D) representation of a three-dimensional (3D) shape of an object in the 3D model in a size and scale in relation to all other objects in the 3D model.

Clause 76. The computer-implemented method of Clause 73, wherein displaying the 3D model further comprises importing the skinned 3D model into a graphics engine.

Clause 77. The computer-implemented method of Clause 76, wherein displaying the 3D model further comprises configuring the graphics engine for texture mapping.

Clause 78. A computer-implemented method comprising: determining coordinates of a viewer's gaze of a three-dimensional (3D) model; determining view times for each coordinate; and determining a heat map color for each coordinate based on the view times; generating a heat map based on the heat map colors.

Clause 79. The computer-implemented method of Clause 78, wherein the view times are determined by measuring an amount of time a viewer's gaze stays at each coordinate in the 3D model.

Clause 80. The computer-implemented method of Clause 78, wherein heat map colors closer to red in a color spectrum correspond to longer view times and heat map colors closer to violet in the color spectrum correspond to shorter view times.

Clause 81. The computer-implemented method of Clause 78, wherein the heat map comprises a view of the 3D model having each coordinate colored by a corresponding heat map color.

Clause 82. A computer-implemented method comprising: exporting a video of a project site as a sequence of images; tracking a camera movement corresponding to the video; determining a coordinate system based on a three-dimensional (3D) model of the project site; and applying the coordinate system to the camera movement.

Clause 83. The computer-implemented method of Clause 82, wherein the video is recorded an unmanned aerial vehicle (UAV) flying over the project site.

Clause 84. The computer-implemented method of Clause 83, wherein the camera movement corresponds to a flight path of the UAV.

Clause 85. The computer-implemented method of Clause 82, further comprising optimizing lens distortion of the sequence of images.

Clause 86. The computer-implemented method of Clause 85, wherein the lens distortion is optimized using a camera correction modifier.

Clause 87. The computer-implemented method of Clause 82, further comprising autotracking frames.

Clause 88. The computer-implemented method of Clause 82, further comprising cleaning trackers for low residual errors.

Clause 89. The computer-implemented method of Clause 82, further comprising aligning the camera movement to the 3D model.

Clause 90. The computer-implemented method of Clause 89, further comprising rendering views of the 3D model based on the camera movement.

Clause 91. The computer-implemented method of Clause 90, further comprising overlaying the rendered views into the video to create composite video.

Clause 92. The computer-implemented method of Clause 91, wherein the composite video includes the 3D model incorporated into the project site.

Clause 93. The system of clause 14, wherein the raster information comprises a plurality of cells arranged in a matrix, wherein each cell of the plurality of cells corresponds to at least one point of the point cloud.

Clause 94. The system of clause 14, wherein the instructions further cause the one or more processors to extrapolate data for the cell from one or more points of the point cloud that correspond to the cell.

Clause 95. The non-transitory computer readable storage medium of clause 18, wherein creating the orthomosaic comprises combining a plurality of images from the optically captured data, wherein each of the plurality of images corresponds to a different view angle.

Clause 96. The non-transitory computer readable storage medium of clause 18, wherein combining the plurality of images comprises overlapping at least a portion of each of the plurality of images to one another, and wherein the instructions further cause the processor to apply a geometric correction to the combined plurality of images to remove perspective distortions from the plurality of images.

FURTHER CONSIDERATIONS

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

As used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

In one or more aspects, the terms "about," "substantially," and "approximately" may provide an industry-accepted tolerance for their corresponding terms and/or relativity between items, such as from less than one percent to one hundred percent.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope of the present disclosure. Unless otherwise expressed, reference to an element in the singular is not intended to mean "one and only one" unless explicitly stated, but rather is meant to mean "one or more." In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A computer-implemented method comprising:
   generating a first point cloud based on optically captured data of a project site;
   generating raster information from the first point cloud;
   creating surface contours based on the raster information, wherein the surface contours include contour lines that are curves along which the raster information has a constant value;
   generating a second point cloud based on the optically captured data, wherein the second point cloud comprises a collection of colored points having color information retained from the optically captured data;
   generating a building model from the second point cloud, the building model comprising 3D continuous surfaces that utilize photographs for surface properties; and
   creating a three-dimensional (3D) model based on the first point cloud, the surface contours, and the building model.

2. The computer-implemented method of claim 1, further comprising:
ortho-rectifying at least a portion of the 3D model; and
converting the portion of the 3D model into a topographical survey.

3. The computer-implemented method of claim 2, further comprising:
adding vegetation and soil permeability information to the topographical survey based on infrared imagery data of the project site.

4. The computer-implemented method of claim 1, wherein the first point cloud comprises metadata based on the optically captured data.

5. The computer-implemented method of claim 4, wherein the metadata comprises surface color.

6. The computer-implemented method of claim 4, wherein the surface contours include properties based on the metadata.

7. The computer-implemented method of claim 1, wherein the building model comprises building metadata.

8. The computer-implemented method of claim 7, wherein the building metadata comprises one or more of window information, door thresholds, building dimensions, and sills.

9. The computer-implemented method of claim 1, further comprising:
determining ground control aerial targets of the project site;
determining a ground sample distance (GSD); and
optically capturing the optically captured data based on the ground control aerial targets and the GSD.

10. The computer-implemented method of claim 1, further comprising classifying portions of the first point cloud into terrain portions and above-ground portions.

11. The computer-implemented method of claim 1, further comprising creating an orthomosaic based on the optically captured data.

12. The computer-implemented method of claim 11, wherein creating the 3D model comprises converting the orthomosaic into the 3D model, the 3D model comprising the orthomosaic.

13. A computer-implemented method comprising:
generating a first point cloud based on optically captured data of a project site;
classifying portions of the first point cloud into terrain or above ground;
generating raster information from the first point cloud using average cell sampling;
creating surface contours based on the raster information, wherein the surface contours include contour lines that are curves along which the raster information has a constant value;
creating an orthomosaic based on the optically captured data;
generating a second point cloud based on the optically captured data, wherein the second point cloud comprises a collection of colored points having color information retained from the optically captured data;
generating a building model from the second point cloud, the building model comprising 3D continuous surfaces that utilize photographs for surface properties; and
generating a three-dimensional (3D) model based on the first point cloud, the orthomosaic, and the building model.

14. The computer-implemented method of claim 13, further comprising:
ortho-rectifying the 3D model;
converting at least a portion of the 3D model into a topographical survey; and
adding vegetation and soil permeability information to the topographical survey based on infrared imagery data of the project site.

15. The computer-implemented method of claim 13, wherein the first point cloud comprises metadata based on the optically captured data, the metadata including surface color.

16. The computer-implemented method of claim 13, further comprising:
determining ground control aerial targets of the project site;
determining a ground sample distance (GSD); and
optically capturing the optically captured data based on the ground control aerial targets and the GSD.

17. A computer-implemented method comprising:
determining a ground sample distance (GSD);
optically capturing data of a project site based on the GSD;
generating a first point cloud based on the optically captured data of the project site;
classifying portions of the first point cloud into terrain or above ground;
generating raster information from the point cloud using average cell sampling;
creating surface contours based on grid information included in the raster information, wherein the surface contours include contour lines that are curves along which the raster information has a constant value;
creating an orthomosaic based on the optically captured data;
generating a second point cloud based on the optically captured data, wherein the second point cloud comprises a collection of colored points having color information retained from the optically captured data;
generating a building model from the second point cloud, the building model comprising 3D continuous surfaces that utilize photographs for surface properties;
generating a three-dimensional (3D) model based on the first point cloud, the orthomosaic, and the building model; and
converting at least a portion of the 3D model into a topographical survey.

18. The computer-implemented method of claim 17, wherein converting the 3D model into the topographical survey comprises ortho-rectifying the 3D model.

19. The computer-implemented method of claim 17, further comprising:
capturing infrared imagery data of the project site; and
adding vegetation and soil permeability information to the topographical survey based on the infrared imagery data.

20. A computer-implemented method, comprising:
optically capturing a plurality of digital photos of a target landscape, the plurality of digital photos;
generating a first three-dimensional (3D) point cloud from first data derived from the plurality of digital photos, wherein the first 3D point cloud comprises metadata not available in laser-surveyed data;
classifying portions of the generated first 3D point cloud into terrain and above ground portions using a classification tool;

generating, after classifying the portions of the 3D point cloud, raster information from the first 3D point cloud, the raster information comprising a matrix of cells, each of the cells corresponding to a location and including cell data derived from an interpolation of values of points of the 3D point cloud within the cell;

generating a plurality of contours from the generated raster information;

generating an orthomosiac of the target landscape based on the plurality of digital photos;

generating a plurality of polygons around predetermined features in the generated orthomosiac based on the first 3D point cloud and the metadata not available in laser-surveyed data;

generating a second 3D point cloud from second data derived from the plurality of digital photos, wherein the second 3D point cloud comprises a collection of colored points having color information retained from the plurality of digital photos;

generating a building model from the second 3D point cloud, the building model comprising 3D continuous surfaces that utilize photographs for surface properties;

harmonizing units of measurements for the first 3D point cloud and the building model;

importing and positioning the building model within the first 3D point cloud based the harmonized units of measurements;

generating a 3D model using the generated orthomosiac and continuous surfaces of the building model; and providing the 3D model for display on a display screen.

\* \* \* \* \*